Jan. 4, 1949.  E. SCHWARTZ  2,458,103
ELECTRIC BOILER
Filed Feb. 14, 1946  3 Sheets-Sheet 1

EMANUEL SCHWARTZ
INVENTOR.
BY: Julian J. Wittal
HIS ATTORNEY.

Jan. 4, 1949.   E. SCHWARTZ   2,458,103
ELECTRIC BOILER
Filed Feb. 14, 1946   3 Sheets-Sheet 3

EMANUEL SCHWARTZ
INVENTOR.
BY Julian J. Wittel,
HIS ATTORNEY.

Patented Jan. 4, 1949

2,458,103

UNITED STATES PATENT OFFICE 2,458,103

ELECTRIC BOILER

Emanuel Schwartz, New York, N. Y.

Application February 14, 1946, Serial No. 647,459

10 Claims. (Cl. 219—38)

This invention relates to resistor type electrically heated steam boilers and this application is a continuation in part of my co-pending application for Electric boilers, filed August 4, 1944; Serial No. 547,995, now abandoned.

This invention is an improvement on shell type boilers with tubular or blade immersion heaters that have a small heating surface and insufficient capacity to heat a large, stationary mass of water. There are also known at present larger boilers, called the "fire-tube" electric boilers with resistor ribbons or coils inside numerous tubes; but such boilers require a great consumption of electric energy and are costly to maintain.

There also are in use circulation heaters attached to the side of a tank; but such circulation heaters naturally are limited to small water and steam capacities.

In my present invention, I provide several improvements consisting of a new combination of elements that co-operate to produce superior novel results, the main object being to generate steam and also produce hot water rapidly in a shell type boiler having relatively large water and steam capacity, and less consumption of electric current.

My improved electrically heated steam boiler has the following novel features:

A plurality of steam generating cylinders, with an improved electric heater tube in each cylinder, all cylinders submerged in a vertical position in the water content of a standard shell boiler of relatively large water capacity. The surrounding water enters through small openings, or inlets, near the bottom of each cylinder, and steam is generated in them very rapidly and is discharged through an exhaust pipe and nozzle from the top of each cylinder into a steam space directly opposite an electric superheater therein. This superheater is an electrically heated dry box which serves as a combination steam separator and superheater.

Another novel feature is the construction of the heater tube which preferably is made of copper and is placed inside each steam generating cylinder. This tube has flat sides and within the same and attached thereto is a refractory core with longitudinal channels. Standard strip heaters, each having a long, corrugated spring attached to its rear, are arranged in the channels of the refractory core and are so pressed against the sides of the heater tube. Thus, electric heat is transmitted to the surrounding water by conduction, radiation and convection. As a result this boiler consumes less electric current.

This new type electric boiler has also the following additional advantages: Its construction is simple and self-contained. The interior of each cylinder is easily accessible for cleaning, and the heating elements can be readily removed and repaired or exchanged without disturbing the water content in the boiler.

Other objects, advantages and novel features of this invention will be apparent from the accompanying drawings, the subjoined detailed description, and the appended claims.

In the drawings, forming a part of this specification and accompanying the same, Fig. 1 is a sectional longitudinal view of a boiler showing the steam generating cylinders, exhaust pipes and nozzle and the superheater;

Fig. 7 is an elevational view of a heater tube with looped spring arrangement;

Figure 1:
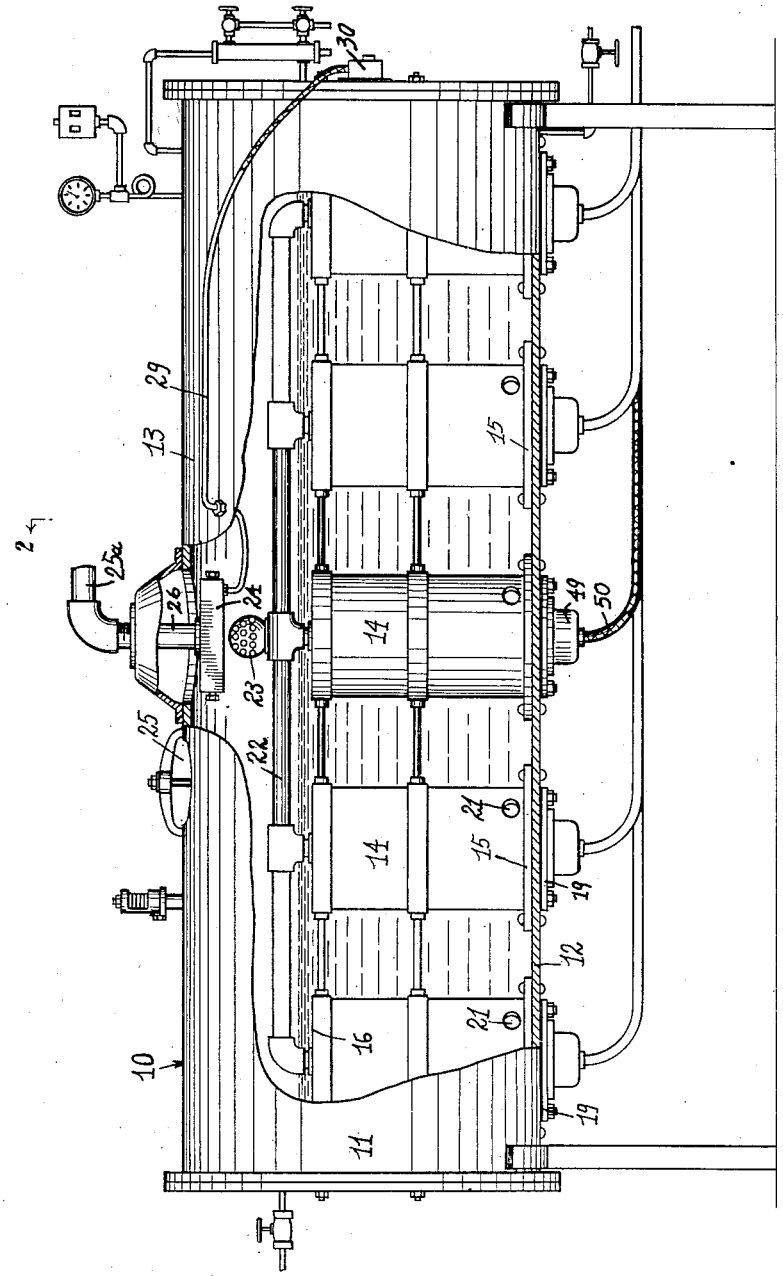
Figure 2:
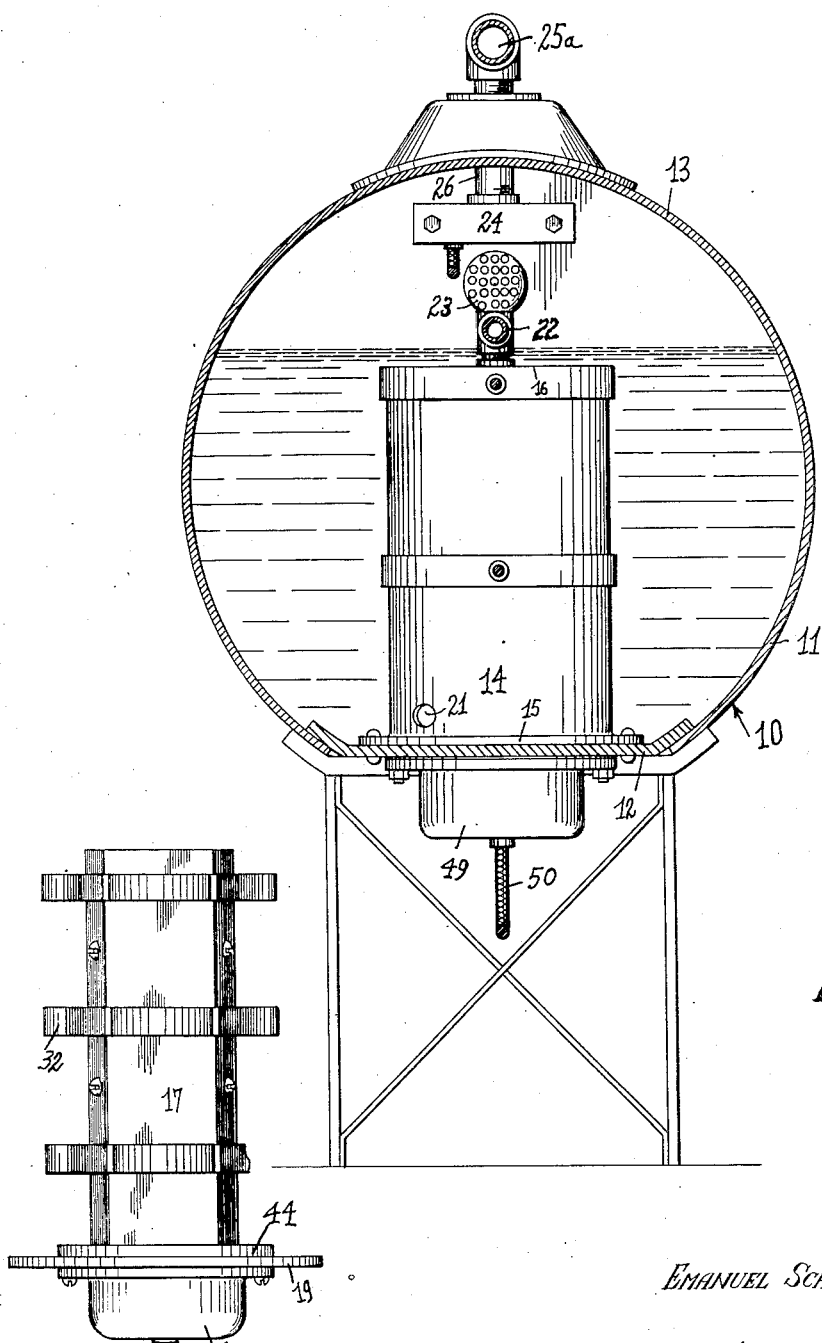
Fig. 2 is a cross-sectional view of the boiler, on line 2—2 of Fig. 1.

Referring now to the drawings more in detail, by characters of reference, the numeral 10 indicates my boiler in general, being mainly composed of a cylindrical shell 11 which, in the illustration chosen for this specification but not in a limiting sense, is of the horizontal type, having a flat bottom 12 and a rounded top 13.

This boiler is provided with appropriate fittings, as water and pressure gauges, feed water pipe, blow-down valve, safety valve, man-hole and other usual devices, well known in this art, and therefore only partly shown in Fig. 1. It may also have other auxiliary equipment, as automatic pressure control, automatic water level regulator, feed water heater, pump, etc., (not shown).

A desired number of steam generating cylinders 14 are secured to the bottom 12 of the boiler by means of flanges 15. The steam generating cylinders 14 will be judiciously chosen as to size and number. In the drawing Fig. 1, for example, is shown five such cylinders. The steam generating cylinders 14, like the boiler shell 11, are made of steel and are secured to the bottom 12 of the boiler through flanges 15, and by any usual means, thus forming an integral part of same and being watertight. The cylinders 14 are closed at the top as at 16, and open at the bottom, through which the heater tubes 17 can be inserted thereinto, through openings 18 in the boiler shell 12, which openings then will be securely closed and sealed by sealing disks 19. The cylinders are completely submerged in the water content of the boiler. The water level is well below the exhaust pipe 22 and nozzle 23 thus leaving ample space for the preliminary drying and storage of the steam.

An opening 21 is provided adjacent to the lower end of each cylinder through which the water flows by gravity and pressure and also fills the cylinder up to the water level. Thus there is water both, within and around, the cylinders, and as the cylinders 14 are internally heated to a high temperature the comparatively small volume of water inside each cylinder is rapidly turned into steam. At the same time, the water surrounding the cylinders is pre-heated. This outer hot water will then enter the steam generating cylinders 14.

At the center of the top of each cylinder is a short steam exit pipe that connects to a long exhaust pipe 22 in a communication with the top of each cylinder and leading the steam generated towards the center. Here the exhaust pipe 22 has a perforated ball-shaped nozzle 23 through which the wet steam is discharged into the steam space directly opposite an electrically heated superheater 24. The ball nozzle 23 is secured to the exhaust pipe 22 in an easily removable manner, as by screw threads. A manhole 25 is arranged in the top of the boiler within reaching distance of the nozzle 23 where through the same may be removed when desired and an appropriate fluid may be flushed down the exhaust pipe 22 and through the cylinders 14, for the purpose of cleaning the same.

As shown in Figs. 1, 2, 8 and 9, an electrically heated dry box or steam superheater 24 is suspended within the steam space directly opposite the ball nozzle 23. This superheater is secured to the steam outlet 25a by a short pipe 26 threaded at both ends. A disk type electric heating element 27 is clamped to the inside of bottom 28 of said superheater. The heating element is independently connected to the electric circuit by means of an insulated cable 29 along the side of the boiler to its front where a switch 30 may control it. The top 31 of the superheater has a plurality of perforations 31 through which steam flows and may enter it and then leave by the outlet 26—25a.

The saturated steam is heated and dried by impact as it is sprayed from the nozzle 23 against the hot bottom 28 of the superheater. Thus it also serves as a baffle to separate the wet from the dry steam. Further moisture is eliminated when passing through the perforations 31a and is finally still more heated within the superheater 24. The whole steam superheater unit is accessible through the manhole 25.

This electrically heated dry box has a comparatively large heating surface. It operates in conjunction with the steam generating cylinders and serves as a combination steam separator and super heater within the steam space.

Figure 4:
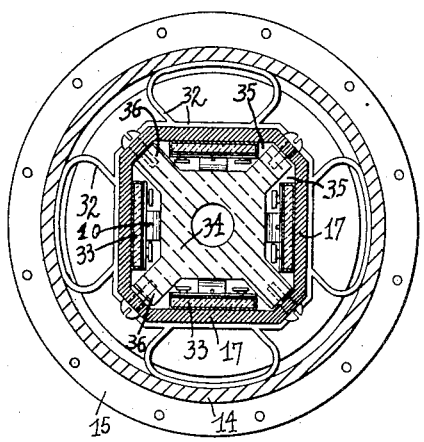
Fig. 4 is a cross-sectional view, the section being taken on the line 4—4 of Fig. 3.
Figure 8:
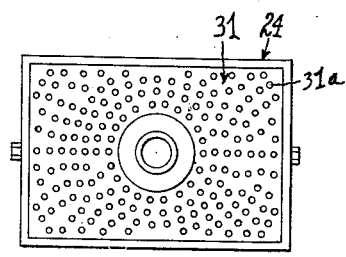
Figs. 8 and 9 are plan and sectional views, respectively, of a dry-box, steam separator and superheater used in my invention.
Figure 9:
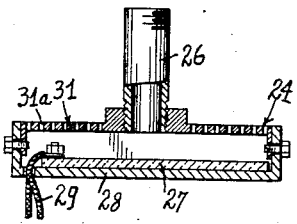
Figure 6:
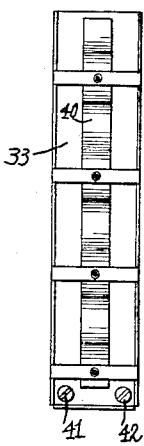
Fig. 6 is a rear view of an electric heater strip used in my heater tubes.

The heating of the water and the production of steam is effected by heater tubes 17, of the cross-section of Fig. 4, made of a high heat conductive metal as copper, each being located concentrically within the respective steam producing cylinder 14. There is an annular water space of several inches between the heater tube and the cylinder. Also, the heater tube 17 has several radially, flexible looped metal band attachments 32, which fit snugly against the inside of each cylinder 14. This device serves to support the heater tube within the cylinder and at the same time permit its expansion and contraction due to heating. They also increase the heating surface of the tubes.

It will be noted that the heater tube is octagonal in shape, having four wide sides and four narrower sides. This unique construction is designed for the purpose of accommodating the four strip heater elements 33 to be described hereinafter. Also within said heater tube 17 is a refractory core 34 made of a strong insulating material. The refractory core has four wide longitudinal channels 35 and it is attached by means of the abutments 36 to the narrower sides of the tube.

The heater tube 17, in combination with the refractory core 34 and strip heater elements 33 has the following advantages: (a) The abutments 36 of the refractory core 34 support and reinforce the sides of the heater tube, and provide narrow air spaces between the core and the heater tube. (b) The strip heater elements 33 fit the annular space within the longitudinal channels of the core, through which they can be easily inserted. (c) The electric heat that is generated is confined to the annular air space and this heat is radiated to the wall of the copper heating tube 17.

Accordingly, this heater tube utilizes all three forms of heat transfer; namely, by conduction, radiation and convection currents and, therefore, my heat transmission device to my knowledge and belief is more efficient than similar devices used in boilers at present. A corrugated spring 40 is attached to the rear of each strip heater element 33, by welding or any other appropriate means. It is a single, long wave-like spring, the high points of which lean against the refractory core 34 and so firmly press the strip heater 33 against the side of the heater tube 17.

Another purpose of this construction is to make it possible to easily insert or remove the strip heater elements 33 that fit snugly inside the channels between the refractory core 34 and the sides of the heater tube 17. It is not necessary that the springs fit tighly. In order to make the insertions still easier, after the strip heaters 33 are inserted, a long, steel strip (not shown in the drawings) may be wedged between the refractory core 34 and the corrugated spring 40. The corrugated springs also permit the expansion and contraction of the heating elements, due to heating.

At this point I wish to remark that the strip heater elements 33 are of standard make with flat sides and have a maximum heating temperature of 1200 degrees F. However, this temperature need not be limited, as it is not beyond the possibility to substitute more powerful electrical heating elements having higher temperatures. The said strip heaters 33 have current connector posts 41 and 42 at their lower ends, whereby to connect them into an appropriate electric circuit, as will be described presently.

The heater tube 17 is open at the bottom, exposing four oblong air space openings between the refractory core and the sides of the tube. Also, by means of a flange 44 the heater tube is welded or brazed to a large circular steel flange head 19. Through this flange head the heater tube unit, inside of the cylinder 14, is secured to the bottom 12 of the boiler 11. A suitable gasket may be placed between the flange head 19 and boiler bottom 12 so as to have an absolutely watertight joint. When cleaning the boiler or making repairs in the interior of the cylinder 14, the complete heater tube unit 17 can be removed together with its flange head 19.

Figure 3:
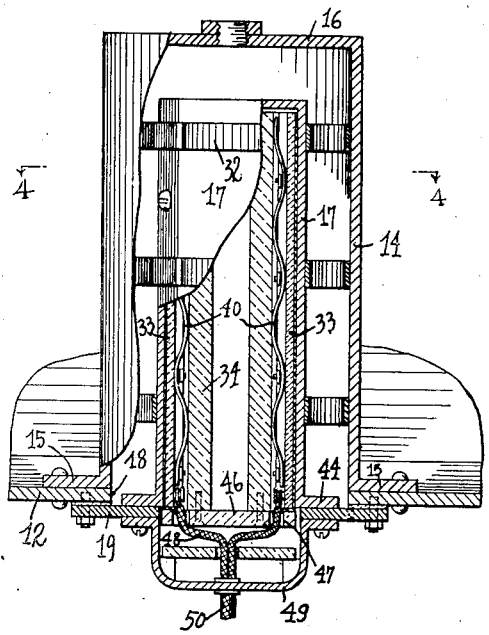
Fig. 3 is a partly sectional and partly elevational view of a steam generating cylinder and the heater tube therein.
Figure 5:
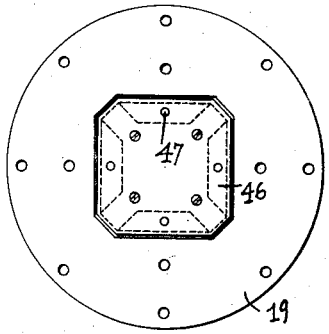
Fig. 5 is a bottom view of a combination bottom closure disk for the heater tube units.

As shown in Figs. 3 and 5, there is a central plate 46 in the flange head 19. This plate is made of a heat insulating material and is shaped to register with the inside cross section of the heater tube 17. The purpose of the plate 46 is to prevent loss of heat through the bottom of the tube 17; and also to make it possible to remove the strip heaters 33 without disturbing the water inside the cylinder 14. If, however, the complete heater tube unit 17 with flange head 19 is to be withdrawn the boiler must first be emptied of its water content.

It will be noted further that there are four small holes 47 in the insulating plate 46 through which the electric cables 48 are drawn that connect same to electric conduit posts 41 and 42. A removable terminal box 49 is also secured to said plate 19, in which the electric cables are arranged and outwardly connected, as at 50. Plate 46 may be secured to the bottom of the refractory core 34, by bolts, or any other appropriate means (not shown).

The submerged steam generating cylinders are the major features of my electric boiler, which is self-contained and has a natural, simple circulating system. I am aware that there are proposed boilers with water tubes, or tanks containing water, said tubes or tank being heated internally by electric heating elements or externally by oil burners or other means, but not of the construction combination and operation of my present invention.

My electric boiler, described hereinbefore, not only is of radically different construction, it also operates upon an entirely different and novel principle.

My new electric boiler pertains specifically to electrically heated steam generating cylinders completely submerged in the water content and it operates like a combination flash and shell boiler; that is, the water inside the cylinders is rapidly flashed into steam, while, at the same time, there is ample reserve of hot water surrounding the cylinders.

Moreover, my electric boiler may have higher steam pressures and still be safe in operation since the pressures within and around the steam generating cylinders are uniformly balanced.

From the foregoing description, taken in connection with the drawings accompanying the same, and from the remarks and explanations offered, the advantages and methods of construction and operation of my invention will be readily understood by those versed in the art to which my invention appertains, and while I have described devices which I now consider to be the best embodiment thereof, I desire to have it understood that they are shown as merely illustrative and not limiting, and that such changes may be made when desired, as are within the spirit of this specification and the scope of the claims hereunto appended.

Figure 10:
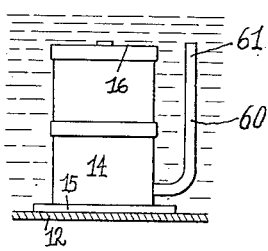
Fig. 10 is a diagrammatic fragmentary view of a modified form of my steam generating cylinders.

One such change is illustrated in Fig. 10. In this modification, a guide tube 60 is arranged at the side of each steam generating cylinder 14 leading into the bottom thereof, being open at the top 61, and submerged in the water. The preheated water will then flow through tube 60 into the cylinder 14.

Having thus described my invention, what I claim is:

1. In a boiler, a plurality of vertical steam generating cylinders secured to the bottom of the boiler, each cylinder having a water inlet opening in its side near the lower end, an electric heater tube inside the cylinder, an outlet pipe at the top of each cylinder, said outlet pipes all connected to a steam pipe leading to a perforated ball-shaped nozzle in the center of the steam space, said nozzle being detachable.

2. In a cylinder, a heater tube made of a high heat conductive metal, octagon in shape, having four wide flat sides and four narrow sides, a refractory core therein, abutments from said core secured to the respective narrow sides of the heater tube, longitudinal channels being provided in said core opposite said wide sides, and electric heater elements in said channels.

3. In a cylinder, as set forth in claim 2, said electrical heating elements being in the form of flat strips, and an elongated single, waved corrugated flat spring attached to the rear side of each strip, said spring attachment being approximately of the same width as the strip heater.

4. In a cylinder, as set forth in claim 2, said electrical heating elements being in the form of flat strips, said strip heaters being arranged in the channels between the refractory core and the heater tube, and spring means between said core and said flat heating strips to press the same against the inner side of the heater tube.

5. A steam boiler comprising, in combination, a shell and a plurality of vertical cylinders closed at both ends and secured to the bottom of the shell, an electrical heater tube inside each cylinder, a ring space being provided between said heater tube and the cylinder, a water inlet opening in the side and near the lower end of each cylinder, a steam outlet at the top of each cylinder above the water level, a steam pipe connecting said outlets, an exit nozzle in the center of the steam pipe, and an electrically heated dry-box and steam separator within the steam space of the boiler opposite said exit nozzle.

6. In a boiler, vertical steam generating cylinders closed at both ends and secured to the bottom of the boiler shell, an electric heater tube inside said cylinder and a ring space being provided between said heater tube and the cylinder, a water feed tube arranged on the outside of each cylinder, spaced apart therefrom, said filler tube being open at the top, its lower end connected to an inlet opening in the side of the cylinder, whereby the pre-heated water near the top of the boiler will be guided by the filler tube into the cylinder near the bottom, said filler tube being entirely submerged in the water content of the boiler.

7. In a boiler, having a steam space and steam generator means delivering steam into said space, a steam drier and super-heater in said steam space being in the form of a closed box, a flat bottom for said box, electric heating means in said box, said box having a plurality of perforations in its walls above said bottom, a steam exit from said box to the outside, and means to guide the steam generated and to cause it to impinge against said bottom, whereby the steam will primarily be dried, then will enter said box through said perforations and will additionally be dried and superheated therein, and will then leave the boiler through said exit.

8. In a device as set forth in claim 7, said electric heater being of flat shape secured on said bottom.

9. In a device as set forth in claim 7, said boiler having a water space under said steam space, a plurality of steam generating units in said water space, pipes to conduct the steam generated to a perforated nozzle device underneath said box so that the steam may first strike the bottom of said box, before entering the same.

10. In a device as set forth in claim 9, said electric heater being of flat shape and secured inside of the box on said bottom.

EMANUEL SCHWARTZ.

REFERENCES CITED

The following references are of record in the file of this patent:

UNITED STATES PATENTS

| Number | Name | Date |
|---|---|---|
| 1,047,389 | Cooper | Dec. 17, 1912 |
| 1,141,888 | Schmidt | June 1, 1915 |
| 1,258,642 | Bergeron | Mar. 12, 1918 |
| 1,329,204 | Patterson | Jan. 27, 1920 |
| 1,336,559 | Gutzwiller | Apr. 13, 1920 |
| 1,564,322 | Campbell | Dec. 8, 1925 |
| 1,587,559 | Shuman | June 8, 1926 |
| 1,614,330 | Wiegand | Jan. 11, 1927 |
| 1,653,672 | Shriner | Dec. 27, 1927 |
| 1,670,437 | Campbell | May 22, 1928 |
| 1,670,506 | Johnson | May 22, 1928 |
| 1,704,413 | Wait | Mar. 5, 1929 |
| 1,707,453 | Winograd | Apr. 2, 1929 |
| 1,749,969 | Brodin | Mar. 11, 1930 |
| 1,802,967 | Case | Apr. 28, 1931 |
| 1,927,023 | Colbie | Sept. 19, 1933 |
| 1,984,262 | Glenn | Dec. 11, 1934 |
| 2,081,206 | Parker | Mar. 25, 1937 |